(12) United States Patent  
Levitan et al.

(10) Patent No.: US 7,844,807 B2
(45) Date of Patent: Nov. 30, 2010

(54) BRANCH TARGET ADDRESS CACHE STORING DIRECT PREDICTIONS

(75) Inventors: David S. Levitan, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/024,197

(22) Filed: Feb. 1, 2008

(65) Prior Publication Data

US 2009/0198981 A1 Aug. 6, 2009

(51) Int. Cl.
G06F 9/35 (2006.01)
G06F 9/355 (2006.01)
G06F 9/40 (2006.01)

(52) U.S. Cl. .................... 712/240; 712/239

(58) Field of Classification Search .............. 712/234, 712/238, 239, 240
See application file for complete search history.

(56) References Cited

U.S. PATENT DOCUMENTS

| | | | |
|---|---|---|---|
| 6,279,105 B1 | 8/2001 | Konigsburg et al. | |
| 6,279,106 B1 * | 8/2001 | Roberts | 712/239 |
| 6,353,882 B1 | 3/2002 | Hunt | |
| 6,484,256 B1 | 11/2002 | Levitan et al. | |
| 6,516,409 B1 | 2/2003 | Sato | |
| 6,611,910 B2 | 8/2003 | Sharangpani et al. | |
| 6,823,447 B2 | 11/2004 | Hay et al. | |
| 2002/0178349 A1 | 11/2002 | Shibayama et al. | |
| 2002/0199092 A1 | 12/2002 | Henry et al. | |
| 2005/0027967 A1 | 2/2005 | Sperber et al. | |
| 2005/0091475 A1 | 4/2005 | Sodani | |
| 2005/0262332 A1 | 11/2005 | Rappoport et al. | |
| 2006/0174096 A1 | 8/2006 | Konigsburg et al. | |
| 2006/0221960 A1 | 10/2006 | Borgione | |
| 2006/0236080 A1 | 10/2006 | Doing et al. | |

(Continued)

FOREIGN PATENT DOCUMENTS

EP 462587 12/1991

(Continued)

OTHER PUBLICATIONS

Levitan et al.; "Data Processing System, Processor and Method of Data Processing Having Improved Branch Target Address Cache"; U.S. Appl. No. 11/837,893, filed Aug. 13, 7007.

(Continued)

*Primary Examiner*—Daniel Pan
(74) *Attorney, Agent, or Firm*—Dillon & Yudell LLP

(57) ABSTRACT

In at least one embodiment, a processor includes at least one execution unit and instruction sequencing logic that fetches instructions for execution by the execution unit. The instruction sequencing logic includes branch logic that outputs predicted branch target addresses for use as instruction fetch addresses. The branch logic includes a branch target address cache (BTAC) having at least one direct entry providing storage for a direct branch target address prediction associating a first instruction fetch address with a branch target address to be used as a second instruction fetch address immediately after the first instruction fetch address and at least one indirect entry providing storage for an indirect branch target address prediction associating a third instruction fetch address with a branch target address to be used as a fourth instruction fetch address subsequent to both the third instruction fetch address and an intervening fifth instruction fetch address.

19 Claims, 5 Drawing Sheets

U.S. PATENT DOCUMENTS

2007/0033318 A1 2/2007 Gilday et al.
2008/0046702 A1* 2/2008 Morrow ............ 712/238

OTHER PUBLICATIONS

Bradford et al.; "Data Processing System, Processor and Method of Data Processing Having Improved Branch Target Address Cache"; U.S. Appl. No. 11/561,002; filed Nov. 17, 2006.

Eberly Jr. et al.; "The Correlation Branch Target Address Cache"; IBM TDB, vol. 36, No. 5, pp. 83-86, May 1996.

Eickenmeyer; "Improving Instruction Cache Branch Prediction with Target Addresses"; IBM TDB, vol. 36, No. 7, pp. 497-498, Jul. 1993.

* cited by examiner

BRANCH TARGET ADDRESS CACHE STORING DIRECT PREDICTIONS

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, to branch prediction. Still more particularly, the present invention relates to a data processing system, processor and method of data processing with an improved branch target address cache (BTAC).

2. Description of the Related Art

A state-of-the-art microprocessor can comprise, for example, a cache for storing instructions and data, an instruction sequencing unit for fetching instructions from the cache, ordering the fetched instructions, and dispatching the fetched instructions for execution, one or more sequential instruction execution units for processing sequential instructions, and a branch processing unit (BPU) for processing branch instructions.

Branch instructions processed by the BPU can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bit(s) or the value of a counter.

Conditional branch instructions can be further classified as either resolved or unresolved based upon whether or not the condition upon which the branch depends is available when the conditional branch instruction is evaluated by the BPU. Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively predict the outcomes of unresolved branch instructions as taken or not taken. Utilizing the result of the prediction, the instruction sequencing unit is then able to fetch instructions within the speculative execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined prior to program execution, or utilizing dynamic branch prediction, which predicts resolutions of branch instructions by reference to branch history accumulated on a per-address basis within a branch history table (BHT) and/or branch target address cache (BTAC).

Modern microprocessors require multiple cycles to fetch instructions from the instruction cache, scan the fetched instructions for branches, and predict the outcome of unresolved conditional branch instructions. If any branch is predicted as taken, instruction fetch is redirected to the new, predicted address. This process of changing which instructions are being fetched is called "instruction fetch redirect". During the several cycles required for the instruction fetch, branch scan, and instruction fetch redirect, instructions continue to be fetched along the not taken path; in the case of a predicted-taken branch, the instructions within the predicted-taken path are discarded, resulting in decreased performance and wasted power dissipation.

Several existing approaches are utilized to reduce or to eliminate the instruction fetch redirect penalty. One commonly used method is the implementation of a BTAC that in each entry caches the branch target address of a taken branch in association with the branch instruction's tag. In operation, the BTAC is accessed in parallel with the instruction cache and is searched for an entry whose instruction tag matches the fetch address transmitted to the instruction cache. If such a BTAC entry exists, instruction fetch is redirected to the branch target address provided in the matching BTAC entry. Because the BTAC access typically takes fewer cycles than the instruction fetch, branch scan, and taken branch redirect sequence, a correct BTAC prediction can improve performance by causing instruction fetch to begin at a new address sooner than if there were no BTAC present.

However, in conventional designs, the BTAC access still generally requires multiple cycles, meaning that in the case of a BTAC hit at least one cycle elapses before the taken branch redirect. The interval between the BTAC access and the instruction fetch redirect represents a "bubble" during which no useful work is performed by the instruction fetch pipeline. Unfortunately, this interval tends to grow as processors achieve higher and higher operating frequencies and as BTAC sizes increase in response to the larger total number of instructions (i.e., "instruction footprint") of newer software applications.

SUMMARY OF THE INVENTION

In at least one embodiment, a processor includes at least one execution unit and instruction sequencing logic that fetches instructions for execution by the execution unit. The instruction sequencing logic includes branch logic that outputs predicted branch target addresses for use as instruction fetch addresses. The branch logic includes a branch target address cache (BTAC) having at least one direct entry providing storage for a direct branch target address prediction associating a first instruction fetch address with a branch target address to be used as a second instruction fetch address immediately after the first instruction fetch address and at least one indirect entry providing storage for an indirect branch target address prediction associating a third instruction fetch address with a branch target address to be used as a fourth instruction fetch address subsequent to both the third instruction fetch address and an intervening fifth instruction fetch address.

DETAILED DESCRIPTION OF ILLUSTRATIVE EMBODIMENT

Figure 1:
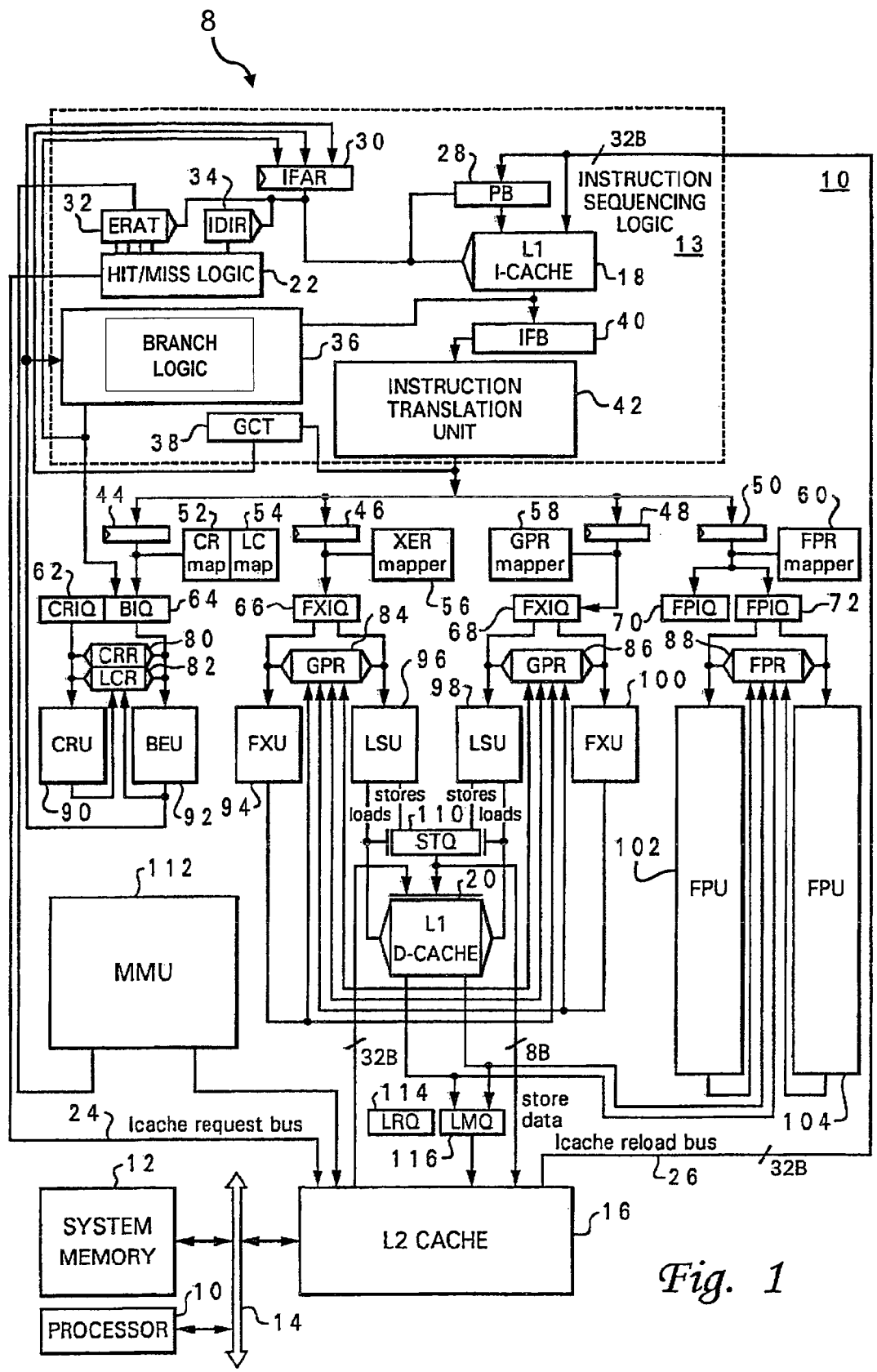
FIG. 1 is an exemplary embodiment of a data processing system in accordance with the present invention.

With reference now to FIG. 1, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a block of instructions (e.g., a 32-byte cache line) to be fetched from L1 I-cache 18 for processing. During each cycle, a new instruction fetch address (IFA) may be loaded into IFAR 30 from one of at least three sources: branch logic 36, which provides speculative branch target addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the block of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the block of instructions specified by the EA in IFAR 30 resides in L1 cache 18, L1 I-cache 18 outputs the block of instructions to both branch logic 36 and to instruction fetch buffer (IFB) 40. As described further below with respect to FIG. 2, branch logic 36 scans the block of instructions for branch instructions and predicts the outcome of conditional branch instructions in the instruction block, if any. Following a branch prediction, branch logic 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the block of instructions received from L1 I-cache 18 until the block of instructions can be translated, if necessary, by an instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. In some embodiments, the instructions are also maintained in issue queues 62-72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90-104 is preferably implemented as an execution pipeline having a number of pipeline stages.

During execution within one of execution units 90-104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by branch logic 36. If the path addresses match, branch logic 36 updates its prediction facilities, if necessary. If, however, the calculated path address does not match the predicted path address, BEU 92 supplies the correct path address to IFAR 30, and branch logic 36 updates its prediction facilities, as described further below. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Figure 2:
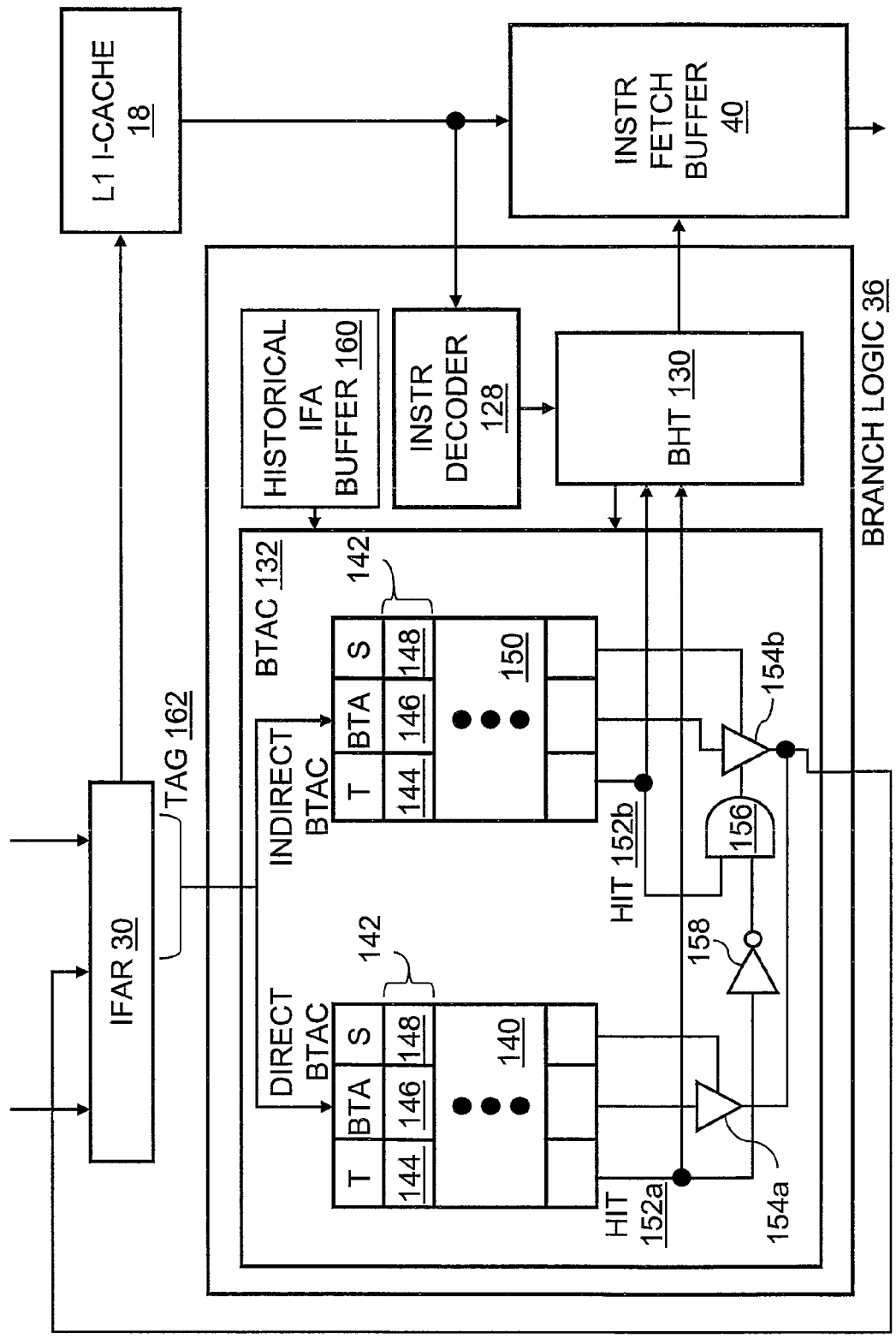
FIG. 2 is a more detailed block diagram of the Branch Target Address Cache (BTAC) within the data processing system of FIG. 1.

Referring now to FIG. 2, there is depicted a more detailed block diagram of an exemplary embodiment of branch logic 36 of FIG. 1 in relation to other components of instruction sequencing logic 13. In the illustrated embodiment, branch logic 36 includes a historical instruction fetch address (IFA) buffer 160 that buffers one or more previous values of IFAR 30 (if available), an instruction decoder 128, branch direction prediction circuitry, such as branch history table (BHT) 130, and branch target address prediction circuitry, such as branch target address cache (BTAC) 132. In alternative embodiments of the present invention, the branch direction prediction circuitry can be implemented utilizing any other type of branch direction prediction circuitry, including without limitation, static branch prediction circuitry or two-level dynamic branch prediction circuitry. In addition, the branch target address prediction circuitry can also be implemented utilizing other known or future developed branch target address prediction circuitry, such as a branch target buffer (BTB). Further, in some embodiments, the physical structures utilized for branch direction prediction and branch target address prediction may be merged. The present invention is equally applicable to all such embodiments.

Instruction decoder 128 is coupled to receive each cache line of instructions as it is fetched from L1 I-cache 18 and placed in instruction fetch buffer 40. Instruction decoder 128 scans each cache line of instructions for branch instructions, and in response to detecting a branch instruction, forwards the branch instruction to the branch direction prediction circuitry (e.g., BHT 130) for direction prediction. As further indicated by the connection between BHT 130 and instruction fetch buffer 40, in the event BTAC 132 invokes fetching along a path that BHT 130 predicts as not-taken, BHT 130 cancels the instructions in the incorrect path from instruction fetch buffer 40 and redirects fetching along the correct path.

In accordance with the present invention, the branch target address prediction circuitry (hereinafter, referred to as BTAC 132) includes an indirect BTAC 150 having an N-cycle access latency (e.g., two cycles) that stores addresses of instruction blocks to be fetched N processor clock cycle later. For example, in embodiments in which N=2, indirect BTAC 150 stores address of instruction blocks to be fetched in the processor clock cycle following fetching of the next instruction block. Thus, for the instruction address sequence 0x100, 0x120, 0x200, BTAC 150 would store an entry associating instruction address 0x100 with predicted branch target address 0x200.

In the depicted embodiment, indirect BTAC 150 includes multiple entries 142, each including a tag (T) field 144 for storing a tag portion of an instruction fetch address (IFA), a branch target address (BTA) field 146 for storing a BTA, and a state (S) field 148 indicating state information for the entry 142. In various embodiments, state field 148 may simply indicate validity of its entry 142 or may alternatively or additionally provide additional information, such as the type of entry and/or a score indicating a confidence in the correctness of the BTA.

As discussed further below, the ability to establish indirect predictions in BTAC 150 depends upon the availability of previous instruction fetch addresses, for example, in historical IFA buffer 160. However, under some operating conditions, for example, following machine reboot, context switch or pipeline flush, historical IFA buffer 160 is empty and therefore cannot provide the previous instruction fetch address. For performance reasons, it is nevertheless desirable under such operating conditions to establish BTA predictions in BTAC 132.

Accordingly, a BTAC 132 in accordance with the present invention further includes storage for direct predictions, meaning predicted addresses of the next instruction blocks to be fetched. Storage for direct predictions can be implemented in BTAC 132 in a number of different ways. For example, in some embodiments, one or more direct predictions are stored in one or more entries 142 of indirect BTAC 150 and marked in status field 148 as direct predictions. Alternatively, or additionally, one or more entries 142 in indirect BTAC 150 may be exclusively allocated for direct predictions or may be stored in a way of a set-associative BTAC containing at least one way for indirect predictions and at least one way for direct predictions. Further, as further shown in FIG. 2, BTAC 132 may include dedicated storage for direct predictions in a direct BTAC 140. As indicated by like reference numerals, direct BTAC 140, like indirect BTAC 150, includes multiple entries 142, each including a tag (T) field 144 for storing a tag portion of an instruction fetch address (IFA), a branch target address (BTA) field 146 for storing a BTA, and a state (S) field 148 indicating state information for the entry 142.

In operation, direct BTAC 140 and indirect BTAC 150 are accessed by the tag 162 of the IFA in IFAR 30 in parallel with the access to L1 I-cache 18. If tag 162 of the IFA in IFAR 30 does not match the contents of any tag field 144 of any entry 142 in direct BTAC 140 or indirect BTAC 150, direct BTAC 140 and indirect BTAC 150 deassert their respective hit signals 152a and 152b. If, on the other hand, tag 162 matches the contents of a tag field 144 of an entry 142 in one or both of direct BTAC 140 and indirect BTAC 150, each BTAC in which a hit occurs asserts its hit signal 152a or 152b and outputs the BTA associated with the matching tag field 144. If a hit occurs in direct BTAC 140, the BTA is qualified at a first buffer 154a by the state information within the state field 148 of the matching entry 142, and if successfully qualified, is presented to IFAR 30 for selection. If a hit alternatively or additionally occurs in indirect BTAC 150, the BTA is qualified at a second buffer 154b by the state information within the state field 148 of the matching entry 142 and additionally by the deassertion of hit signal 152a (as indicated by inverter 158 and AND gate 156). If the BTA output by indirect BTAC 150 is successfully qualified, second buffer 152 presents the BTA output by indirect BTAC 150 to IFAR 30. Thus, if direct BTAC 140 and indirect BTAC 150 both output a branch target address prediction in a given processor clock cycle, the result output by direct BTAC 140 is used.

BTAC 132 is updated, as needed, when branch prediction is performed. As shown, hit signals 152a, 152b from direct BTAC 140 and indirect BTAC 150 are passed to the branch direction prediction circuitry (e.g., BHT 130). If the result of the branch direction prediction is not an instruction fetch redirect (i.e., the branch is predicted as not taken) and branch instruction tag 162 hit in one or both of direct BTAC 140 and indirect BTAC 150, BHT 130 sends an invalidation request to remove the incorrect branch target address prediction from each of BTAC 140 and BTAC 150. Alternatively, if the result of the branch direction prediction is an instruction fetch redirect and branch instruction tag 162 missed in both direct BTAC 140 and indirect BTAC 150, BHT 130 sends an insertion request to a selected one of BTACs 140, 150 to request insertion of a new entry 142 associated the IFA with the branch target address to which fetching was redirected. In a preferred embodiment, when a BTAC insertion request is generated, the request is sent to BTAC 140 or BTAC 150 based upon whether a corresponding IFA resides in historical IFA buffer 160. Thus, BHT 130 transmits the insertion request to indirect BTAC 150 if the IFA immediately preceding the IFA of the predicted branch is still buffered in historical IFA buffer 160 when the insertion request is generated. Otherwise, BHT 130 directs the insertion request to direct BTAC 140. Further details regarding the operation of BTAC 132 are described below with reference to FIGS. 3-4.

Figure 3:
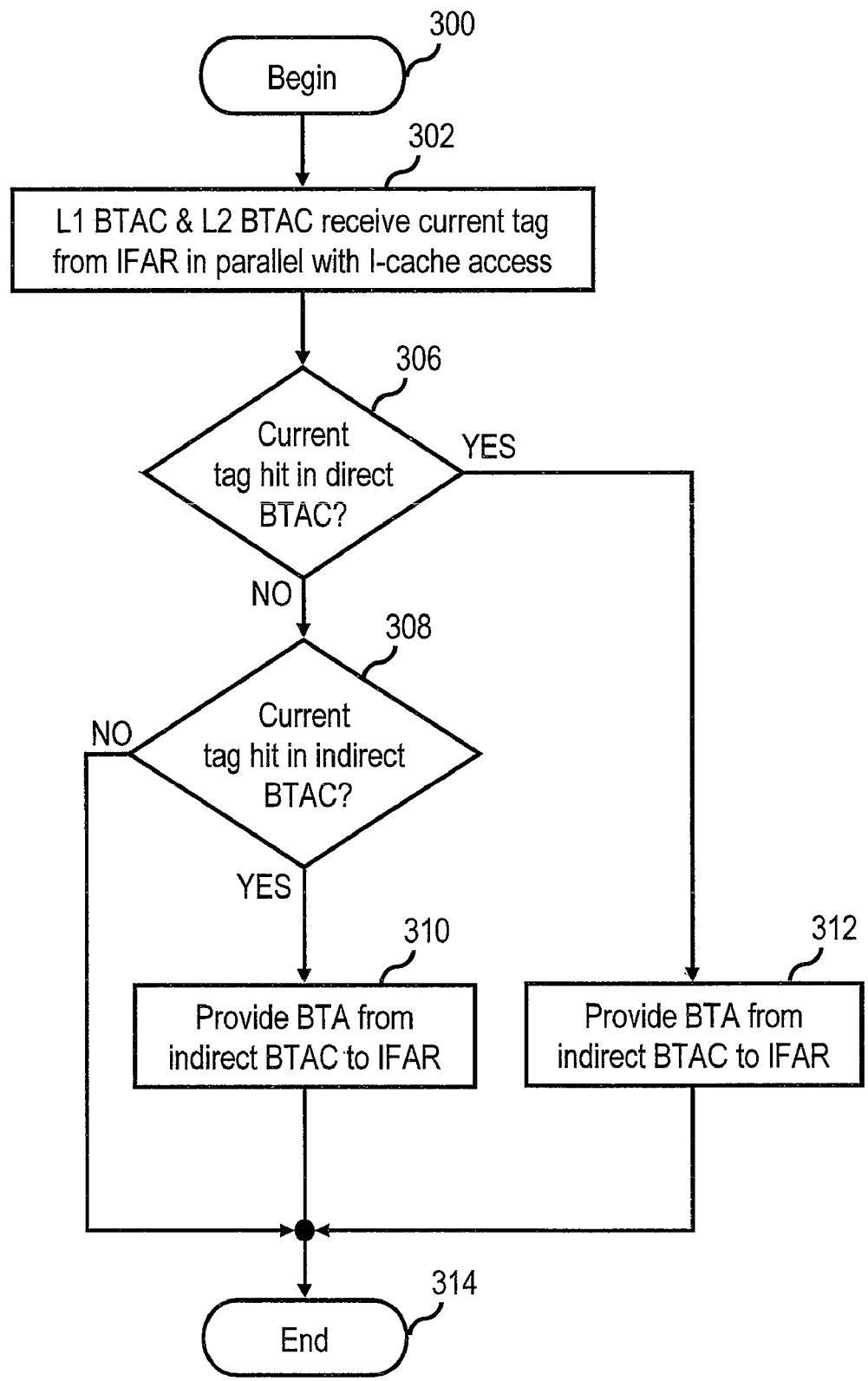
FIG. 3 is a high level logical flowchart of an exemplary method by which a Branch Target Address Cache (BTAC) generates instruction fetch addresses in accordance with the present invention.

With reference now to FIG. 3, there is illustrated a high level logical flowchart of an exemplary method by which BTAC 132 generates and outputs speculative branch target addresses (BTAs) in accordance with the present invention. The depicted process begins at block 300 and then proceeds to block 302, which illustrates BTAC 132 receiving the tag 162 of the instruction fetch address (IFA) in IFAR 30 concurrently with the transmission of the IFA to L1 I-cache 18 to initiate a fetch of an instruction block. In response to receipt of tag 162 by BTAC 132, indirect BTAC 150 and direct BTAC 140 (or other storage for direct BTA predictions) are accessed concurrently to determine if tag 162 hits in an entry 142, that is, whether the tag 162 matches the contents of any of tag fields 144 of entries 142.

If the current tag 162 hits in direct BTAC 140 (and the resulting hit signal 152a is successfully qualified by the contents of the state field 148 of the matching entry 142), the process proceeds to block 312. Block 312 depicts BTAC 132 presenting to IFAR 30 the predicted branch target address output by direct BTAC 140. However, if the current tag 162 misses in direct BTAC 140 and hits in indirect BTAC 150 as shown at block 308 (and the resulting hit signal 152b is successfully qualified by the contents of the state field 148 of the matching entry 142), the process proceeds to block 310. Block 310 illustrates BTAC 132 presenting to IFAR 30 the predicted branch target address output by indirect BTAC 150 N processor clock cycles following receipt by BTAC 132 of the previous tag 162. Following either block 310 or block 312, or following a negative determination at both of blocks 306 and 308, the process illustrated in FIG. 3 terminates until a next tag 162 is received by BTAC 132.

Figure 4A:
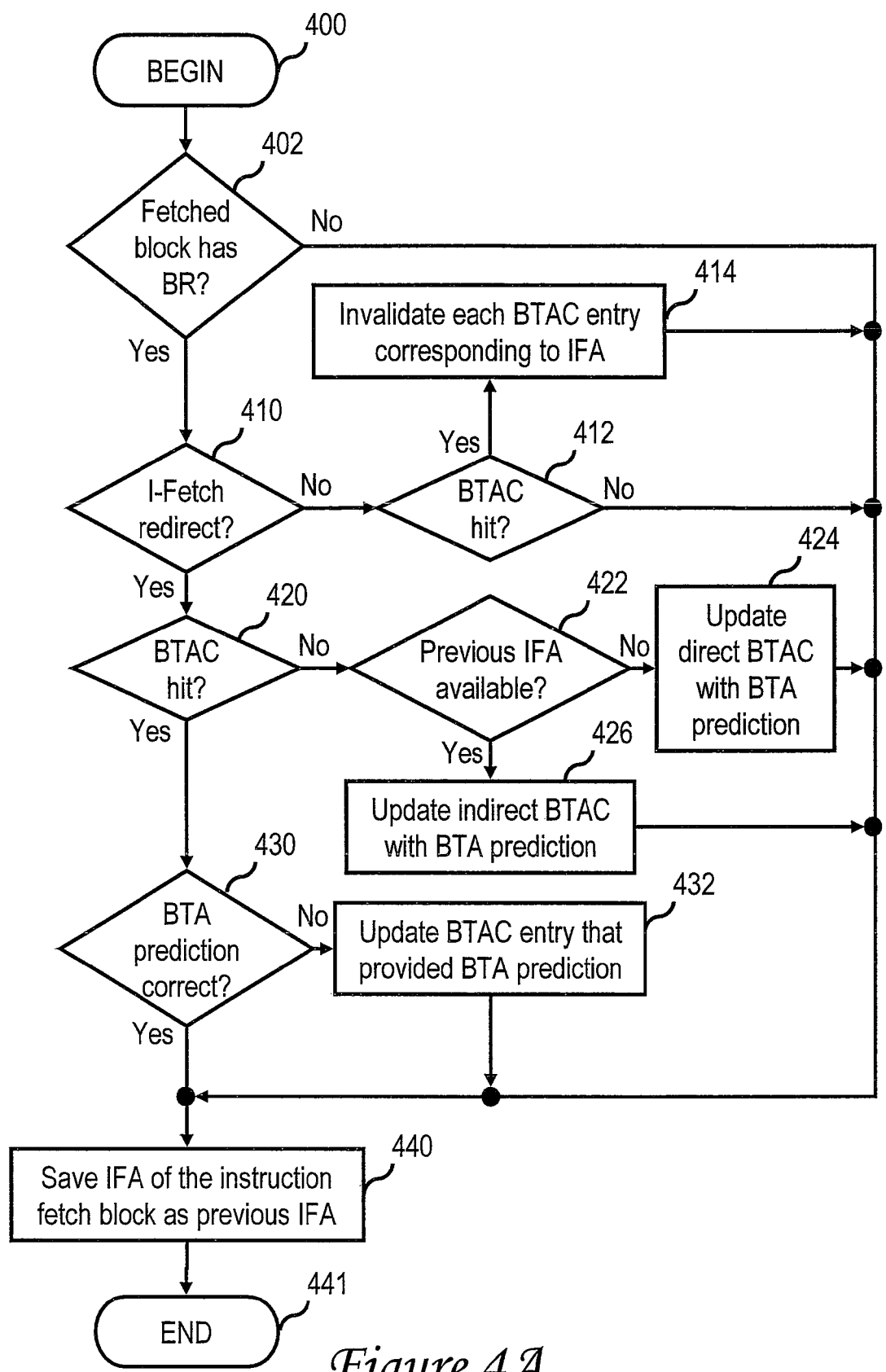
FIG. 4A is a high level logical flowchart of an exemplary method by which the branch target address predictions within the BTAC are updated by branch logic in accordance with the present invention.

Referring now to FIG. 4A, there is illustrated a high level logical flowchart that depicts an exemplary method by which the branch target address predictions within BTAC 132 are updated in accordance with the present invention. The process begins at block 400 of FIG. 4 and then passes to block 402, which depicts branch logic 36 determining whether or not a block of instructions (e.g., a 32 byte cache line) fetched from L1 I-cache 18 includes a branch instruction. If not, no update to BTAC 36 is made. The process shown in FIG. 4 therefore passes from block 402 to block 440, which depicts branch logic 36 saving the IFA of the instruction fetch block as the previous IFA within historical IFA buffer 160 at block 440. The process thereafter terminates at block 441 until a subsequent instruction block is fetched.

Returning to block 402, if branch logic 36 determines at the 402 that the fetched instruction block includes a branch instruction, the process proceeds to block 410. Block 410 depicts branch logic 36 determining whether the fetched instruction block contains an unconditional taken branch or a conditional branch predicted as "taken" by BHT 130. If so, the process proceeds from block 410 to block 420, which is described below. If not, the process passes to block 412, which depicts branch logic 36 determining from hit signals 152a, 152b whether the tag 162 of the IFA hit in one or more of direct BTAC 140 and indirect BTAC 150. If not, no update to BTAC 132 is made, and the process passes from block 412 to blocks 440-441, which have been described. If, however, a determination is made at block 412 that tag 162 hits in one or more of direct BTAC 140 and indirect BTAC 150, meaning that BTAC 132 has at least one entry predicting a redirect target address for a fetched instruction block containing no branch that would cause a fetch redirect, branch logic 36 invalidates each entry 142 in BTAC 132 (i.e., in direct BTAC 140 and/or indirect BTAC 150) with matching tag 162 (block 414). Such invalidation may be performed, for example, by updating the state field(s) of the relevant entry or entries 142. Thereafter, the process passes to blocks 440-441, which have been described.

Referring now to block 420, if branch logic 36 determines that a branch instruction within the fetched instruction block was either unconditionally "taken" or predicted as "taken" and tag 162 hit in BTAC 132, the process proceeds to block 430, which is described below. If, however, branch logic 36 determines at block 420 that a branch instruction within the fetched instruction block was "taken" and tag 162 missed in BTAC 132, the process proceeds to block 422. Block 422 illustrates branch logic 36 determining whether historical IFA buffer 160 buffers the previous IFA immediately preceding the IFA that generated the fetch of the instruction block containing the taken branch instruction in question. As noted above, IFA buffer 160 may not buffer the IFA for a number of reasons, including occurrence of a reboot of the machine, a context switch, or a pipeline flush.

If branch logic 36 determines at block 422 that the previous IFA is not available, branch logic 36 inserts within direct BTAC 140 a new entry 142 containing the tag portion of the current IFA in tag field 144 and the branch target address predicted by BHT 130 in BTA field 146. If, on the other hand, branch logic 36 determines at block 422 that historical IFA buffer 160 still retains the previous IFA immediately preceding the current IFA that generated the fetch of the instruction block containing the conditional branch instruction in question, branch logic 36 inserts within indirect BTAC 150 a new entry 142 containing the tag portion of the previous IFA in tag field 144 and the branch target address predicted by BHT 130 in BTA field 146. Following either of blocks 424 and 426, the process passes to blocks 440-441, which have been described.

With reference now to block 430, if branch logic 36 determines that the fetched instruction block contains a taken branch and tag 162 hit in BTAC 132, branch logic 36 further determines whether the BTA prediction is confirmed as correct by BHT 130. If so, no update to BTAC 132 is required, and the process proceeds to blocks 440-441, which have been described. If, however, BHT 130 indicates at block 430 that the BTA predicted by BTAC 132 was incorrect, branch logic 36 updates the BTA field 146 of the entry 142 that provided the incorrect BTA prediction with the correct BTA. Thereafter, the process proceeds to blocks 440-441, which have been described.

Figure 4B:
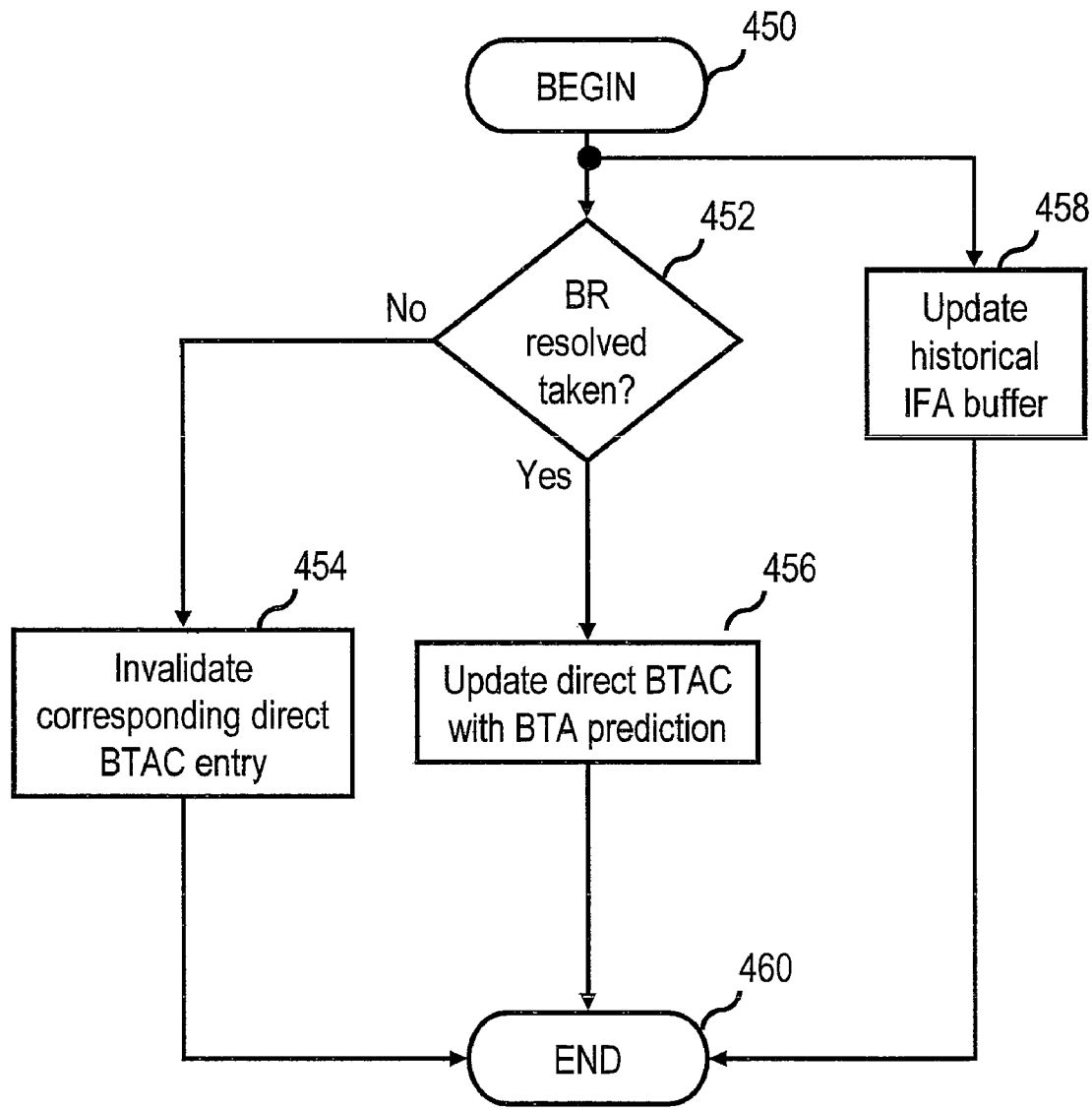
FIG. 4B is a high level logical flowchart of an exemplary method by which the branch target address predictions within the BTAC are updated in response to operation of a branch execution unit in accordance with the present invention.

With reference now to FIG. 4B, there is illustrated a high level logical flowchart of an exemplary process by which BEU 92 updates branch target address predictions in branch unit 36, if necessary, in response to the detection of branch mispredictions. The process begins at block 450 and then proceeds to block 452, which depicts BEU 92 determining whether the correct behavior of a branch is "taken." If a determination is made at block 452 that the branch resolved by BEU 92 is "not taken", the process proceeds to block 454. Block 454 depicts BEU 92 invalidating each entry 142 within direct BTAC 140 whose tag field 144 matches the tag portion 162 of the IFA of the instruction fetch block including the resolved branch. If a determination is made at block 452 that the branch resolved by BEU 92 is "taken", the process proceeds to block 456. Block 456 depicts BEU 92 inserting within direct BTAC 140 a new entry 142 containing the tag portion of the IFA of the instruction fetch block including the resolved branch in tag field 144 and containing the correct branch target address calculated by BEU 92 in BTA field 146. Thereafter, the process shown in FIG. 4B ends at block 460. Concurrently with the operations shown at blocks 452-456, BEU 92 also places the IFA of the instruction fetch block containing the resolved branch in historical IFA buffer 160, displacing a previous IFA if necessary, as shown at block 458.

As has been described, the present invention provides a data processing system, processor and method of data processing in which an improved branch target address cache (BTAC) is utilized to generate branch target address predictions. In accordance with the present invention, the BTAC includes storage for both direct and indirect branch target address predictions. In a preferred embodiment, the direct address prediction is given precedence over an indirect address prediction for the same instruction address.

While the invention has been particularly shown as described with reference to a preferred embodiment, it will be understood by those skilled in the art that various changes in form and detail may be made therein without departing from the spirit and scope of the invention.

What is claimed is:

1. A processor, comprising:
   at least one execution unit that executes instructions; and
   instruction sequencing logic, coupled to the at least one execution unit, that fetches instructions from a memory system for execution by the at least one execution unit, said instruction sequencing logic including a branch logic that outputs predicted branch target addresses for use as instruction fetch addresses, said branch logic including a branch target address cache (BTAC) having:
   at least one direct entry providing storage for a direct branch target address prediction associating a first instruction fetch address with a branch target address to be used as a second instruction fetch address immediately after the first instruction fetch address; and
   at least one indirect entry providing storage for an indirect branch target address prediction associating a third instruction fetch address with a branch target address to be used as a fourth instruction fetch address subsequent to both the third instruction fetch address and an intervening fifth instruction fetch address;
   wherein:
   the branch logic, responsive to the instruction sequencing logic using the third instruction fetch address to initiate an instruction fetch from the memory system, outputs the fourth instruction fetch address; and
   the instruction sequencing logic, following initiation of access to the memory system using the third instruction fetch address, thereafter initiates an instruction fetch from the memory system using the fifth instruction fetch address followed by an instruction fetch from the memory system using the fourth instruction fetch address indicated by the BTAC.

2. The processor of claim 1, wherein said at least one direct entry and said at least one indirect entry reside in a same cache array.

3. The processor of claim 1, wherein:
   said at least one direct entry and said at least one indirect entry reside in different ways of a set-associative cache array.

4. The processor of claim 1, wherein:
   said at least one direct entry and said at least one indirect entry each includes a status field identifying said at least one direct entry and said at least one indirect entry as containing a direct branch target address prediction and an indirect branch target address prediction, respectively.

5. The processor of claim 1, wherein if a given instruction fetch address hits in both one of the said at least one direct entry and one of the said at least one indirect entry of the BTAC, said branch logic employs the direct branch target address prediction rather than the indirect branch target address prediction.

6. The processor of claim 1, wherein:
the at least one execution unit includes a branch execution unit that executes branch instructions;
the branch execution unit reports outcomes of executed branch instructions to the branch logic; and
the branch logic inserts a new branch target address prediction into the BTAC based upon the reported outcome of an executed branch instruction.

7. The processor of claim 6, wherein:
the branch logic includes a buffer that holds at least one previous instruction fetch address; and
the branch logic inserts either an indirect entry or a direct entry based upon availability in the buffer of a particular previous instruction fetch address corresponding to the new branch target address prediction.

8. The processor of claim 1, wherein:
the memory system includes a cache memory within the processor; and
the instruction sequencing logic accesses the BTAC and the cache memory concurrently with the first instruction fetch address.

9. A data processing system, comprising:
at least one processor in accordance with claim 1;
an interconnect coupled to the processor; and
the memory system coupled to the processor via the interconnect and operable to communicate data with the at least one processor.

10. The processor of claim 1, wherein:
the at least one indirect entry of the BTAC has an N-cycle access latency; and
the instruction sequencing unit initiates an instruction fetch from the memory system utilizing the fourth instruction fetch address N cycles after initiating access to the memory system utilizing the third instruction fetch address.

11. A method of data processing in a processor including at least one execution unit and an instruction sequencing logic containing branch logic, the branch logic including a branch target address cache (BTAC), said method comprising:
in the BTAC, holding:
at least one direct entry providing storage for a direct branch target address prediction associating a first instruction fetch address with a branch target address to be used as a second instruction fetch address immediately after the first instruction fetch address; and
at least one indirect entry providing storage for an indirect branch target address prediction associating a third instruction fetch address with a branch target address to be used as a fourth instruction fetch address subsequent to both the third instruction fetch address and an intervening fifth instruction fetch address;
the instruction sequencing logic fetching instructions from a memory system for execution by at least one execution unit of the processor utilizing the third instruction fetch address;
in response to utilization of the third instruction fetch address to fetch instructions from the memory system, the branch logic accessing the BTAC with at least a tag portion of the third instruction fetch address;
in response to said accessing, the BTAC outputting said fourth instruction fetch address; and
the instruction sequencing logic, following initiation of access to the memory system using the third instruction fetch address, thereafter initiating an instruction fetch from the memory system using the fifth instruction fetch address followed by an instruction fetch from the memory system using the fourth instruction fetch address indicated by the BTAC.

12. The method of claim 11, wherein said holding comprises holding said at least one direct entry and said at least one indirect entry reside in a same cache array.

13. The method of claim 11, wherein said holding comprises holding said at least one direct entry and said at least one indirect entry reside in different ways of a set-associative cache array.

14. The method of claim 11, and further comprising:
identifying said at least one direct entry and said at least one indirect entry as containing a direct branch target address prediction and an indirect branch target address prediction, respectively, with a status field.

15. The method of claim 11, and further comprising:
in response to a given instruction fetch address hitting in both one of the at least one direct entry and one of the at least one indirect entry of the BTAC, the branch logic outputting the direct branch target address prediction rather than the indirect branch target address prediction.

16. The method of claim 11, and further comprising:
a branch execution unit executing branch instructions;
the branch execution unit reporting outcomes of executed branch instructions to the branch logic; and
the branch logic inserting a new branch target address prediction into the BTAC based upon the reported outcome of an executed branch instruction.

17. The method of claim 16, wherein:
the branch logic includes a buffer that holds at least one previous instruction fetch address; and
said inserting comprises the branch logic inserting either an indirect entry or a direct entry based upon availability in the buffer of a particular previous instruction fetch address corresponding to the new branch target address prediction.

18. The method of claim 11, wherein:
said memory system includes a cache memory; and
said accessing comprises the instruction sequencing logic accessing the BTAC and a cache memory concurrently with the first instruction fetch address.

19. The method of claim 11, wherein:
the at least one indirect entry of the BTAC has an N-cycle access latency; and
the initiating includes the instruction sequencing unit initiating an instruction fetch from the memory system utilizing the fourth instruction fetch address N cycles after initiating access to the memory system utilizing the third instruction fetch address.

* * * * *